(12) United States Patent
Gershon et al.

(10) Patent No.: US 10,358,359 B2
(45) Date of Patent: Jul. 23, 2019

(54) SOLAR-THERMAL WATER PURIFICATION BY RECYCLING PHOTOVOLTAIC REFLECTION LOSSES

(71) Applicant: International Business Machines Corporation, Armonk, NY (US)

(72) Inventors: Talia S. Gershon, White Plains, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/268,194

(22) Filed: Sep. 16, 2016

(65) Prior Publication Data

US 2018/0079658 A1    Mar. 22, 2018

(51) Int. Cl.
*C02F 1/14* (2006.01)
*C02F 1/44* (2006.01)
(Continued)

(52) U.S. Cl.
CPC .............. *C02F 1/14* (2013.01); *B01D 1/0035* (2013.01); *B01D 1/26* (2013.01); *B01D 5/0003* (2013.01);
(Continued)

(58) Field of Classification Search
CPC ........... C02F 1/14; B01D 1/0035; B01D 1/26; B01D 5/0003; B01D 5/006
See application file for complete search history.

(56) References Cited

U.S. PATENT DOCUMENTS 3,351,120 A * 11/1967 Goeldner ................. B01D 1/26
                                                                        159/13.3
3,941,663 A *  3/1976 Steinbruchel .......... B01D 1/26
                                                                        202/174
(Continued)

FOREIGN PATENT DOCUMENTS

EP        1564816 A1    8/2005
JP      2013096676 A    5/2013
(Continued)

OTHER PUBLICATIONS

English Translation of JP2013179138A by Kitamura Kiminao et al., Sep. 9, 2013.
(Continued)

*Primary Examiner* — Jonathan Miller
(74) *Attorney, Agent, or Firm* — Vazken Alexanian; Michael J. Chang, LLC

(57) ABSTRACT

Techniques for solar thermal water purification by recycling photovoltaic reflection losses are provided. In one aspect, a solar thermal water purification system includes: a water purification component for desalinating salt water, the water purification component having multiple stages through which the salt water passes, and condensers in each of the stages; and a photovoltaic component configured to heat the salt water prior to the salt water entering a first stage of the water purification component, wherein desalinated water evaporates and condenses in each of the stages to be collected as pure water. A system using reverse osmosis and a heat-driven water pump is also provided. Methods for water purification are also provided.

19 Claims, 4 Drawing Sheets

(51) Int. Cl.
  *B01D 1/00* (2006.01)
  *B01D 5/00* (2006.01)
  *B01D 61/02* (2006.01)
  *B01D 1/26* (2006.01)
  *C02F 1/06* (2006.01)

(52) U.S. Cl.
  CPC ........... *B01D 5/006* (2013.01); *B01D 61/025* (2013.01); *C02F 1/441* (2013.01); *B01D 2313/22* (2013.01); *B01D 2313/243* (2013.01); *B01D 2313/36* (2013.01); *C02F 1/06* (2013.01); *C02F 2201/009* (2013.01); *Y02A 20/128* (2018.01); *Y02A 20/129* (2018.01); *Y02A 20/131* (2018.01); *Y02A 20/142* (2018.01); *Y02A 20/212* (2018.01); *Y02W 10/37* (2015.05)

(56) References Cited

U.S. PATENT DOCUMENTS

| | | | | |
|---|---|---|---|---|
| 4,210,121 A | * | 7/1980 | Stark | B01D 3/00 126/573 |
| 4,212,593 A | | 7/1980 | Chadwick | |
| 4,497,689 A | * | 2/1985 | Szucs | B01D 1/22 159/17.1 |
| 5,139,620 A | * | 8/1992 | Elmore | B01D 1/221 203/11 |
| 6,804,962 B1 | * | 10/2004 | Prueitt | B01D 1/0047 60/641.8 |
| 8,043,499 B2 | | 10/2011 | Saeed et al. | |
| 8,277,614 B2 | * | 10/2012 | Alhazmy | B01D 1/26 202/173 |
| 9,278,315 B2 | * | 3/2016 | Davis | B01D 1/0035 |
| 9,393,502 B1 | * | 7/2016 | Zeitoun | B01D 3/065 |
| 9,539,522 B1 | * | 1/2017 | El-Sayed | B01D 1/26 |
| 9,834,455 B2 | * | 12/2017 | Frolov | B01D 1/0047 |
| 2010/0051015 A1 | | 3/2010 | Ammar | |
| 2010/0051018 A1 | | 3/2010 | Ammar et al. | |
| 2010/0154866 A1 | | 6/2010 | Khan | |
| 2011/0005580 A1 | | 1/2011 | Vandermeulen | |
| 2011/0198208 A1 | * | 8/2011 | Olwig | C02F 1/048 203/10 |
| 2013/0168224 A1 | * | 7/2013 | Godshall | B01D 1/0035 203/10 |
| 2013/0306139 A1 | | 11/2013 | Bostwick | |
| 2014/0021031 A1 | * | 1/2014 | Koivusaari | B01D 1/26 203/10 |
| 2014/0290247 A1 | * | 10/2014 | Mishima | B01D 3/065 60/641.9 |
| 2015/0083194 A1 | | 3/2015 | Matsushima | |
| 2015/0143806 A1 | * | 5/2015 | Friesth | F24S 25/50 60/517 |
| 2015/0197150 A1 | | 7/2015 | Shirai | |
| 2016/0380583 A1 | * | 12/2016 | Banerjee | H02S 40/22 136/246 |
| 2017/0275182 A1 | * | 9/2017 | Alshahrani | C02F 1/14 |

FOREIGN PATENT DOCUMENTS

| | | |
|---|---|---|
| JP | 2013179138 A | 9/2013 |
| KR | 20140124967 A | 10/2014 |
| WO | WO2015117134 A1 | 8/2015 |

OTHER PUBLICATIONS

English Translation of JP2013096676A by Eguchi Tatsuya et al., May 20, 2013.

English Translation of KR20140124967A by Im In Ho, Oct. 28, 2014.

List of IBM Patents or Applications Treated as Related.

* cited by examiner

SOLAR-THERMAL WATER PURIFICATION BY RECYCLING PHOTOVOLTAIC REFLECTION LOSSES

FIELD OF THE INVENTION

The present invention relates to water purification techniques, and more particularly, to solar thermal water purification by recycling photovoltaic reflection losses.

BACKGROUND OF THE INVENTION

An effective and efficient water purification process is essential for producing clean drinking water. Current large-scale water purification technology utilizes primarily one of two concepts: (1) a "reverse osmosis" process, wherein water is pressed through a semipermeable membrane to remove ions and other particulates from the water such that only clean drinking water passes through, and (2) desalination via a "multistage flash evaporation" (MSF) process, whereby saline water is heated and passed through various stages held at different pressures; in each stage, some of the water evaporates and is condensed and collected to produce clean drinking water. The latter MSF process can use, for example heat, or waste heat, captured from the burning of fossil fuels to heat the saline water and implement the desalination process, and indeed this has been done commercially. However, not all households have access to either high-tech water-purification membranes or waste heat from the burning of fossil fuels which they could use to purify their water.

Many parts of the world that have abundant sunlight do not necessarily have abundant clean water. In the sunniest areas, photovoltaic (PV) panels can be highly cost-effective.

Thus, it would be desirable to be able to harness a renewable energy source, such as solar radiation, in a water treatment process. A further advantage would be if the process could be scalable such that it could be implemented at a variety of levels thus lessening the reliance on large scale production. It would also be beneficial to make use of light which is typically considered to be unavoidably lost due to reflection from the solar panels.

SUMMARY OF THE INVENTION

The present invention provides techniques for solar thermal water purification by recycling photovoltaic reflection losses. In one aspect of the invention, a solar thermal water purification system is provided. The solar thermal water purification system includes: a water purification component for desalinating salt water, the water purification component having multiple stages through which the salt water passes, wherein fresh water evaporates and condensers in each of the stages; and a photovoltaic component configured to heat the salt water prior to the salt water entering a first stage of the water purification component, wherein desalinated water evaporates and condenses in each of the stages to be collected as pure water.

In another aspect of the invention, a method for water purification is provided. The method includes: providing a thermal water purification system having: i) a water purification component having multiple stages, and condensers in each of the stages, and ii) a photovoltaic component; heating salt water using the photovoltaic component prior to the salt water entering a first stage of the water purification component; passing the salt water through the water purification component, wherein the salt water which has been heated creates steam in each of the stages, and wherein desalinated water from the steam condenses on the condensers; and removing the desalinated water from the condensers in each of the stages.

In yet another aspect of the invention, another solar thermal water purification system is provided. The solar thermal water purification system includes: a reverse osmosis membrane; a heat-driven water pump for pumping salt water through the reverse osmosis membrane; and a photovoltaic component configured to provide heated salt water to the heat-driven water pump.

In still yet another aspect of the invention, another method for water purification is provided. The method includes: providing a thermal water purification system having: i) a reverse osmosis membrane, ii) a heat-driven water pump, and iii) a photovoltaic component configured to provide heated salt water to the heat-driven water pump; heating salt water using the photovoltaic component; providing the heated salt water to the heat-driven water pump; pumping salt water through the reverse osmosis membrane using the heat-driven water pump; and extracting desalinated water from a side of the reverse osmosis membrane opposite the heat-driven water pump.

A more complete understanding of the present invention, as well as further features and advantages of the present invention, will be obtained by reference to the following detailed description and drawings.

DETAILED DESCRIPTION OF PREFERRED EMBODIMENTS

Figure 1:
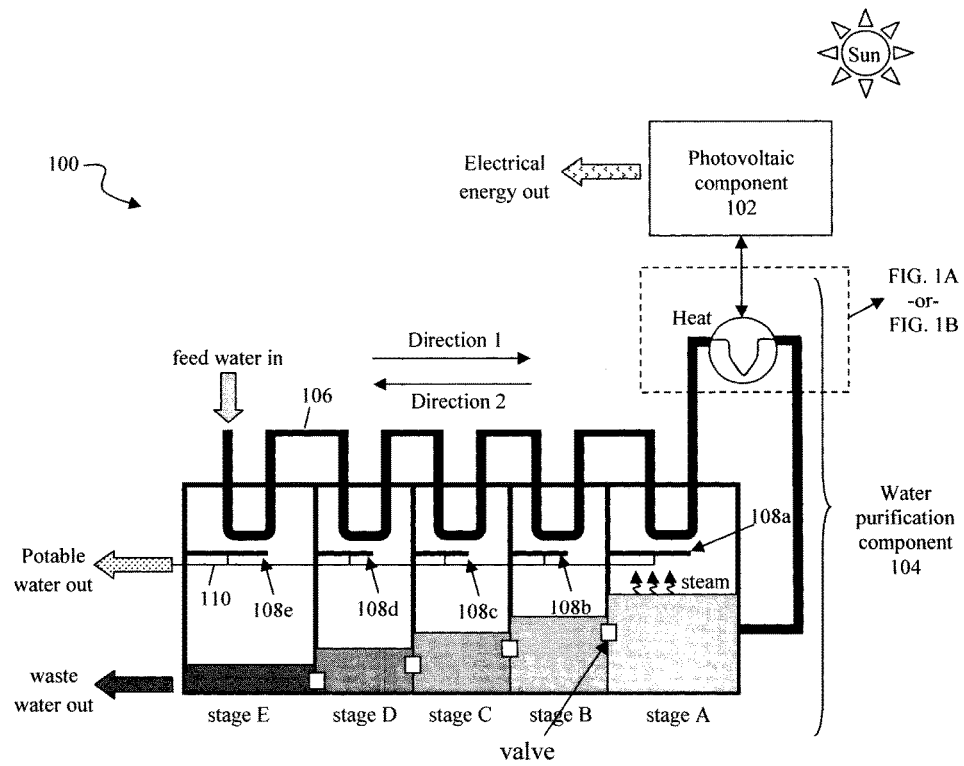
FIG. 1 is a diagram illustrating an exemplary solar thermal water purification system having a photovoltaic component and a water purification component according to an embodiment of the present invention.

Provided herein are techniques for utilizing the waste photons which are usually reflected off of solar panels to supply the heat necessary to accomplish water purification. As provided above, current technology typically requires either direct heat or waste heat obtained from the burning of fossil fuels or semipermeable membranes (for "reverse osmosis") to accomplish desalination on a large scale. Additionally, some degree of reflection loss from the top surface of solar cells is commonly accepted as an unavoidable loss mechanism limiting the full utilization of the solar spectrum. The present techniques would advantageously permit individual households or groups to purify water for drinking without the need for a utility to be involved; alternatively, it could be implemented by a photovoltaics utility company to make use of the reflected photons from large arrays of photovoltaic panels. It could have applications all over the world, including places where access to dirty water is abundant but clean water is hard to come by.

Currently, a majority of water desalination occurs by a process known as multi-stage flash desalination or MSF. See, for example, U.S. Pat. No. 8,277,614 issued to Alhazmy, entitled "Multi-Stage Flash Desalination Plant with Feed Cooler," the contents of which are incorporated by reference as if fully set forth herein. As will be described in detail below, this process involves a series of stages at different temperatures and pressures that correspond to the boiling point of water at each stage. Each stage includes a heat exchanger and a condenser.

During operation, cold salt water is pumped or flows into the system. This supply of cooler feed water can serve as the basis for the action of the condensers (i.e., the lines containing this cooler feed water can be used to condense the steam created in each of the stages). To do so, the lines carrying the feed water are passed through the stages. As a result, the feed water is heated slightly by the temperature in the stages. Prior to entering the stages, additional heat is added to the feed water such that when it is introduced into the first stage, a portion of the feed water will flash into steam. The steam will condense on the condenser in the first stage generating clean potable water which can be extracted from the system. The feed water then passes (through a valve) to the next stage which is at a lower pressure and temperature than the first stage. A portion of the feed water will flash into steam in this second stage and the clean/potable water collected via the respective condenser. Each stage will operate in the same manner just with a lower pressure and temperature than at the previous stage. Waste water is extracted from the final stage. When the cycle from feed water to waste water involves one pass through the MSF system, this configuration is often referred to as a "once-through" MSF system.

With conventional processes, fossil fuels are typically either directly or indirectly used to generate the heat needed to heat the feed water. The use of fossil fuels, however, has notable drawbacks, i.e., it is a non-renewable energy source, it contributes to pollution, etc. Further, the operation of conventional MSF systems is often linked with an energy production utility (e.g., the MSF system is operated in conjunction with a power plant utility). Thus, the desalination process is often tied to large-scale production, and thus not scalable for use by individual households, groups, etc.

Advantageously, the present techniques enable MSF operation utilizing photovoltaic technology. Specifically, the reflected photons lost from a photovoltaic panel are recycled into the (solar thermal) heat needed for water purification. In most cases, reflection losses of about 5% from photovoltaic panels cannot be avoided due to the refractive index of the glass. Water purification is a process that can run off of "low-grade" heat (e.g., a liquid or steam temperature of from about 90° C. to about 120° C., and ranges therebetween), for example using the above-described MSF technique. Thus, photovoltaic technology can be leveraged herein to create both useable electrical energy (i.e., for powering appliances, electronic devices, etc.) as well as thermal energy for driving a water purification process such as MSF desalinator.

An example of the present solar thermal water purification system 100 is now described by way of reference to FIG. 1.

It is noted that an MSF desalinator is used in the present example. However, the present techniques may be used in conjunction with any suitable water purification process that requires heat, such as a reverse osmosis-based purification system with a heat-powered pumping system—see below. In the example shown in FIG. 1, the water purification system 100 includes a photovoltaic-based heat generating component 102 and a water purification component 104. As shown in FIG. 1, the photovoltaic component 102 uses solar energy to generate electricity. Heat is generated as a byproduct of this process. For instance, there are two notable sources of heat that can be generated: (1) photon reflections from the top surface of the photovoltaic panels, and (2) non-radiative recombination inside of photovoltaic panels produces waste heat. As will be described in detail below, the latter can be harnessed to further heat the input water to the system by using it as a cooling source to cool the photovoltaic panels.

The heat from these sources is used to drive the water purification component 104 (in this case an MSF desalinator), wherein potable water is generated from a feed (salt) water source. Thus, advantageously, the present techniques can be implemented as an integrated system providing both solar-generated energy and water purification. This integrated system can be deployed at scales ranging from individual households, to groups, to large scale production.

Figure 2:
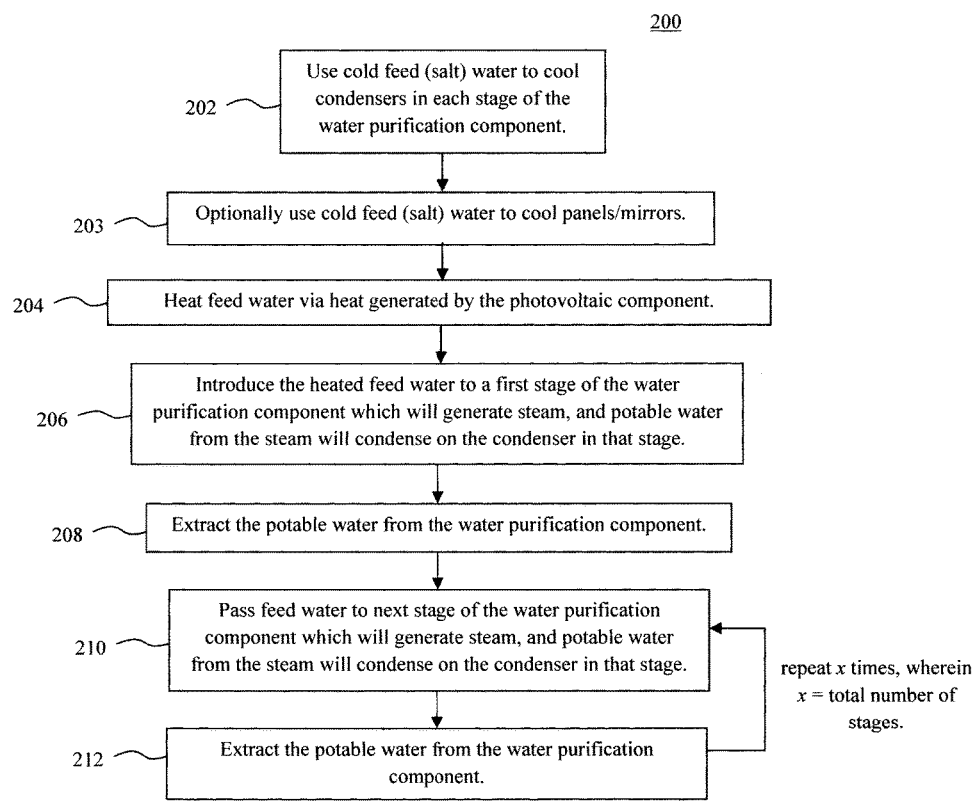
FIG. 2 is a diagram illustrating an exemplary methodology for water purification using, e.g., the system of FIG. 1, according to an embodiment of the present invention.

An exemplary methodology 200 for operating system 100 is now described by way of reference to FIG. 2. It is notable that, while described as a series of discrete steps performed in series, the various steps of methodology 200 may be performed simultaneously and/or in a different order than described. For instance, heat generation from the photovoltaic component 102 and desalination via the water purification component 104 will generally occur simultaneously throughout the process.

In step 202, salt water is introduced into the water purification component 104. Any suitable means for introducing the salt water into the system can be employed, such as pumping, passive flowing from a salt water source, etc. The salt water fed into the system is cold (e.g., it has a temperature of from about 10 degrees Celsius (° C.) to about 35° C. and ranges therebetween). As shown in FIG. 1, the water purification component 104 contains a sequence of chambers (also referred to herein as "stages," i.e., stages A-E) each at a different pressure and temperature than the previous stage in the sequence.

Regarding temperature, referring again to FIG. 1, the conduit 106 that carries the cold salt water (or dirty water) into the water purification component 104 runs successively through each of the stages in a first direction (direction 1). In this particular example, the first direction (Direction 1) is opposite to a direction (i.e., a Direction 2) in which the water will flow into and through the chambers. This cold water in the conduit serves to cool condensers (i.e., condensers 108a, b, c, etc.) within each of the stages (i.e., the conduit carrying the cold water enters each chamber in close proximity to the condenser thereby cooling the condenser). As the cold water flows into the system, it will pick up heat (from the water condensing in the stages) and thus will heat up as it flows into each of the stages. Thus, along Direction 1, the cold water in conduit 106 will cool the first condenser (i.e., condenser 108e in stage E) to a lower temperature than the condenser in the next stage (i.e., condenser 108d in stage D), and so on. Thus, when the water flows through the stages in the opposite direction (Direction 2, i.e., from stage A to stage B, and so on—see below), it will encounter successively lower/cooler temperatures (i.e., stage B is at a lower temperature than stage A, stage C is at a lower temperature than stage B, and so on). This will ensure that maximum condensation will occur at each of the stages.

By way of example only, the condensers 108 in each of the stages can be a simple metal plate or plates (e.g., a series of fins). Conduit 106 likewise can be formed from a metal tubing to maximize heat transfer away from the condensers (and into the cold water feed). Further, as shown in FIG. 1, the stages are formed from a series of sealed (air/water tight) chambers that are connected in series via valves in between each of the chambers/stages. The valves are preferably one way valves that permit water to pass from the first chamber in the series (along the Direction 2)—i.e., stage A—to the second valve in the series—i.e., stage B, and so on, without any backflow into the previous stage. It is notable that while, for ease and clarity of depiction, water purification component 104 is shown having stages A-E, the water purification component 104 can in practice have more (or fewer) stages than shown. For instance, anywhere from 1 to greater than 15 stages can be employed.

Optionally, in step 203 the feed water is used to cool the photovoltaic panels of the photovoltaic component while at the same time absorbing waste heat from the panels. Specifically, as will be described in detail below, the conduit 106 can run behind the photovoltaic panels (and be in physical/thermal contact with the photovoltaic panels) such that the cool feed water that flows through the conduit 106 cools the photovoltaic panels and as such picks up waste heat from the photovoltaic panels. Preferably, this occurs prior to the feed water being heated at the front of the panels (see step 204 described below) which significantly raises the temperature of the feed water thus making it likely unsuitable for cooling purposes.

In step 204, the feed water is heated using heat generated by the photovoltaic component 102. According to an exemplary embodiment, the photovoltaic component 102 is an electric and thermal hybrid solar energy collection system as described, for example, in U.S. patent application Ser. No. 15/268,213, entitled "Method and Apparatus for Hybrid Solar Thermal and Photovoltaic Energy Collection," hereinafter "U.S. patent application Ser. No. 15/268,213," the contents of which are incorporated by reference as if fully set forth herein. For instance, in U.S. patent application Ser. No. 15/268,213 a photovoltaic concentrating thermal collector or PVCTC is provided having photovoltaic panels that are slightly bent from their normal flat geometry to form a parabolic (or otherwise curved) surface such that light reflected off of each panel is focused at a single radial focal point (which is at a fixed distance with respect to the bent panels (in x and y directions) but which extends along the length of the path of water flow (z direction)) and perpendicular to a direction of curvature of the panels. The panels serve to generate electricity, while the light reflected off of the panels is used to heat the feed water into water purification component 104. Namely, a working fluid (in this case the salt water fed to the water purification component 104) can be passed through a tube that runs through the radial focal point of the PVCTC, where it is heated. As described in U.S. patent application Ser. No. 15/268,213, this set-up can be used to heat the working fluid to temperatures at, or above, 95° C., e.g., from about 70° C. to about 120° C. and ranges therebetween.

As shown in FIG. 1, the photovoltaic component 102 is preferably present along the conduit 106 just prior to the point at which the feed water is introduced into the first chamber. Specifically, the conduit 106 carries the (cold) feed water first through the stages so as to cool the condensers 108, then through the photovoltaic component 102 where the feed water is heated, and then finally into the first stage of the water purification component 104. According to an exemplary embodiment, the photovoltaic component 102 is a PVCTC (as described above) and the conduit 106 carries the feed water along the focal point of the PVCTC, where it is heated. See, for example, FIG. 1A.

Figure 1A:
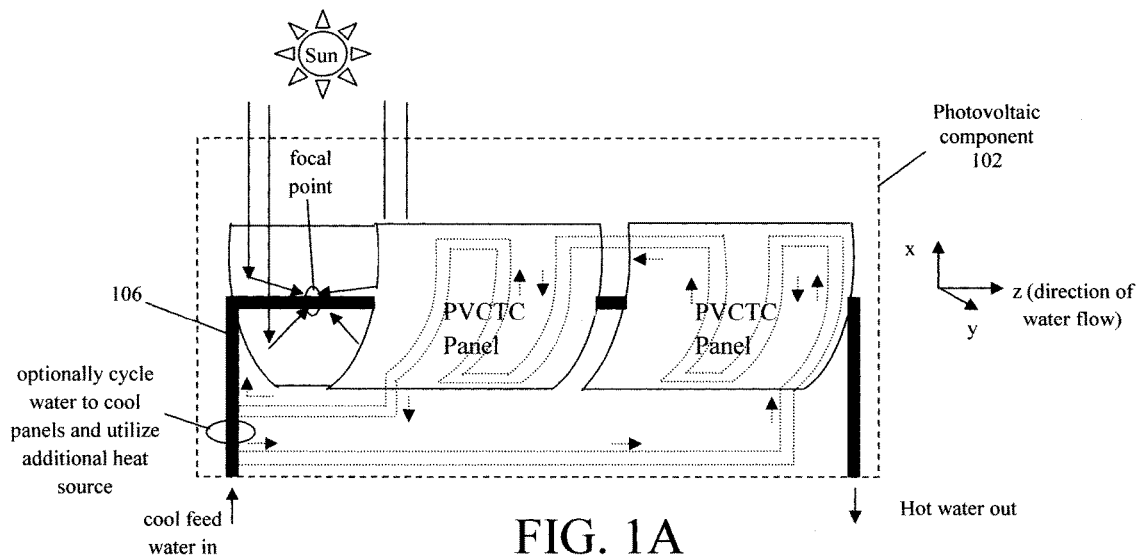
FIG. 1A is a diagram illustrating an exemplary configuration of the photovoltaic component as a photovoltaic concentrating thermal collector or PVCTC according to an embodiment of the present invention.

As shown in FIG. 1A, the photovoltaic component 102 can include multiple PVCTC panels bent slightly to have a curved shape. Accordingly, the panels will reflect sunlight to focal points along the length (i.e., along direction z) of the panels. It is along this axis of focal points that the conduit 106 runs through the photovoltaic component 102. As such, solar radiation incident on the panels is reflected off of the panels and used to heat the feed water in the conduit. Namely, as shown in FIG. 1A, cold water enters the photovoltaic component 102 via conduit 106, where it is heated via the reflective action of the PVCTC panels, and warm water exits the photovoltaic component 102 again via conduit 106. The use of a PVCTC system to heat the feed water and drive the purification process is merely an example, and any suitable photovoltaic device that can provide heating to the feed water may be implemented in accordance with the present techniques as the photovoltaic component 102.

Optionally, as shown in FIG. 1A, prior to passing in front of the PVCTC panels at the focal point an alternative configuration of conduit 106 (shown in dashed lines) first passes behind the PVCTC panels where the conduit 106 is in physical and thermal contact with each of the PVCTC panels. As the cool water passes through the conduit 106 it cools the PVCTC panels and thereby picks up additional waste heat before it is sent through the radial focal point to pick up extra heat. Cooling the panels helps to increase their efficiency. Thus, in this example, the input cool water first passes (e.g., in multiple up/down (as shown) or side-to-side passes—see FIG. 1A) via conduit 106 behind each of the PVCTC panels which serves to cool the PVCTC panels and heat the water. The water then passes via conduit 106 along the focal point in front of the PVCTC panels as described above.

Figure 1B:
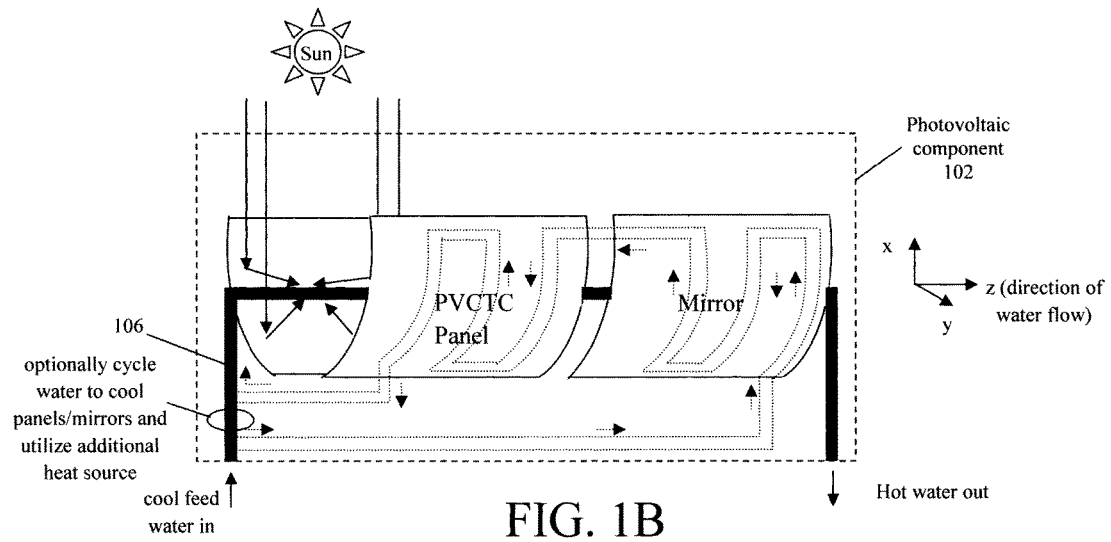
FIG. 1B is a diagram illustrating a combination PVCTC system having both photovoltaic panels and mirrors to increase water purification efficiency according to an embodiment of the present invention.

By way of example only, another suitable configuration of the photovoltaic component can include one or more mirrors (either alone or in combination with a PVCTC system). See FIG. 1B. As shown in FIG. 1B, mirrors are incorporated into the above-described PVCTC system to increase reflection of the incident solar radiation for the purpose of increasing the efficiency of heating the feed water into the water purification component 104. Namely, it can be assumed that mirrors will exhibit about 90% reflection (as compared to about 5% for the panels).

Thus, a combination system (such as is shown in FIG. 1B) is envisioned which combines solar panels and mirrors. Such a combination system would produce more desalinated water than use of panels alone (but less electricity), and less desalinated water than use of mirrors alone (but more electricity).

Optionally, as shown in FIG. 1B, prior to passing in front of the PVCTC panels/mirrors at the focal point an alternative configuration of conduit 106 (shown in dashed lines) first passes behind the PVCTC panels/mirrors where the conduit 106 is in physical and thermal contact with each of the PVCTC panels/mirrors. As the cool water passes through the conduit 106 it cools the PVCTC panels/mirrors and thereby picks up additional waste heat before it is sent through the radial focal point to pick up extra heat. Thus, in this example, the input cool water first passes (e.g., in multiple up/down (as shown) or side-to-side passes—see FIG. 1B) via conduit 106 behind each of the PVCTC panels/mirrors which serves to cool the PVCTC panels/ mirrors and heat the water. The water then passes via conduit 106 along the focal point in front of the PVCTC panels/ mirrors as described above.

Referring back to methodology 200, in step 206 the heated feed water is introduced into a first stage of the water purification component 104 (labeled stage A in FIG. 1). The first stage is at a (first) temperature and pressure. Namely, as described above, the (cold) feed water cools the condenser 108 in each of the stages (condenser 108a in the case of stage A) to a certain temperature. The specific temperature in each of the stages can vary depending on the temperature of the feed water. However, what is notable is that, as provided above, the feed water is used to cool each of the stages in a reverse order to the passage of the water through he stages (i.e., Direction 1 versus Direction 2, respectively). Thus, the condenser in the last stage will be cooler than the condenser in the first stage and, accordingly, the feed water will pass through successively cooler stages as it travels through the water purification component 104. This will permit condensation even as the temperature of the feed water reduces after passing through each stage (i.e., the feed water is heated only prior to entering the first stage).

The heated feed water, upon entering the first stage, will generate steam. See FIG. 1. Potable water from the steam will condense on the condenser (i.e., condenser 108a) in the first stage, and in step 208 that potable water will be removed/extracted from the water purification component 104 via a conduit 110. The potable water collected from the present system is desalinated by action of the evaporation (steam) and condensation. What will remain is salt water at the bottom of the first stage.

In step 210, the remaining salt water from the first stage of the water purification component 104 passes to the second stage (stage B) via the fluid valve in between the stages (see above). Namely, by flowing the feed water into the first stage, a portion will evaporate as steam (and condense) while a portion of the feed water passes to the second stage (via the valve). As noted above, the process is operated continuously where feed water is fed from one end of the water purification component 104 and waste water is removed from the opposite end. Further, as shown in FIG. 1, a portion of the feed water is removed (as potable water) at each of the stages. Thus, by this action, the amount of feed water in each stage becomes progressively smaller.

The same action occurs at the second stage. Namely, the feed water, upon entering the second stage, will generate steam. While the feed water will now be at a slightly lower temperature than in the first stage, the condenser (i.e., condenser 108b) too will be at a lower temperature than the condenser in the first stage (i.e., condenser 108a) (see above), and thus will maximize condensation. Specifically, potable water from the steam will condense on the condenser 108b in the second stage, and in step 212 that potable water will be removed from the water purification component 104 via the conduit 110. The remaining feed water in the second stage will pass, via the respective valve, to the third stage, and so on. This process is repeated x times, where x equals the number of stages in the water purification component 104.

As described above, MSF desalinator-based purification is only one example of a suitable process that can be used in accordance with the present techniques. Other suitable purification processes include, but are not limited to, a reverse osmosis-based purification system with a heat-powered pumping system. See, for example, solar thermal water purification system 300 of FIG. 3. In general, reverse osmosis water purification involves pushing input (e.g., salt) water under pressure through a semi-permeable reverse osmosis membrane. By semi-permeable it means that the membrane is permeable to water but not to ions, particulates, etc. in the water. Osmosis is the process by which a fluid (in this case water) when separated by a semipermeable membrane will move through the membrane so as to equalize the concentration of solute on either side of the membrane. Reverse osmosis operates opposite to this natural gradient and thus requires that the input water be pumped through the semipermeable membrane. In the example of desalination, for instance, a pump is used to pressure the input salt water, forcing the water molecules through the semipermeable membrane while the salt (solute) remains on the other/input side of the membrane. The same principle applies to the process of removing particulates from dirty fresh or salt water. It is the action of the pump that is driven, in accordance with the present techniques, by heat from the photovoltaic component. Specifically, the water pump is a heat-driven water pump that receives heat/steam from the present photovoltaic component in the same manner as described above (i.e., from (1) photon reflections from the top surface of the photovoltaic panels, and (2) non-radiative recombination inside of photovoltaic panels produces waste heat).

Figure 3:
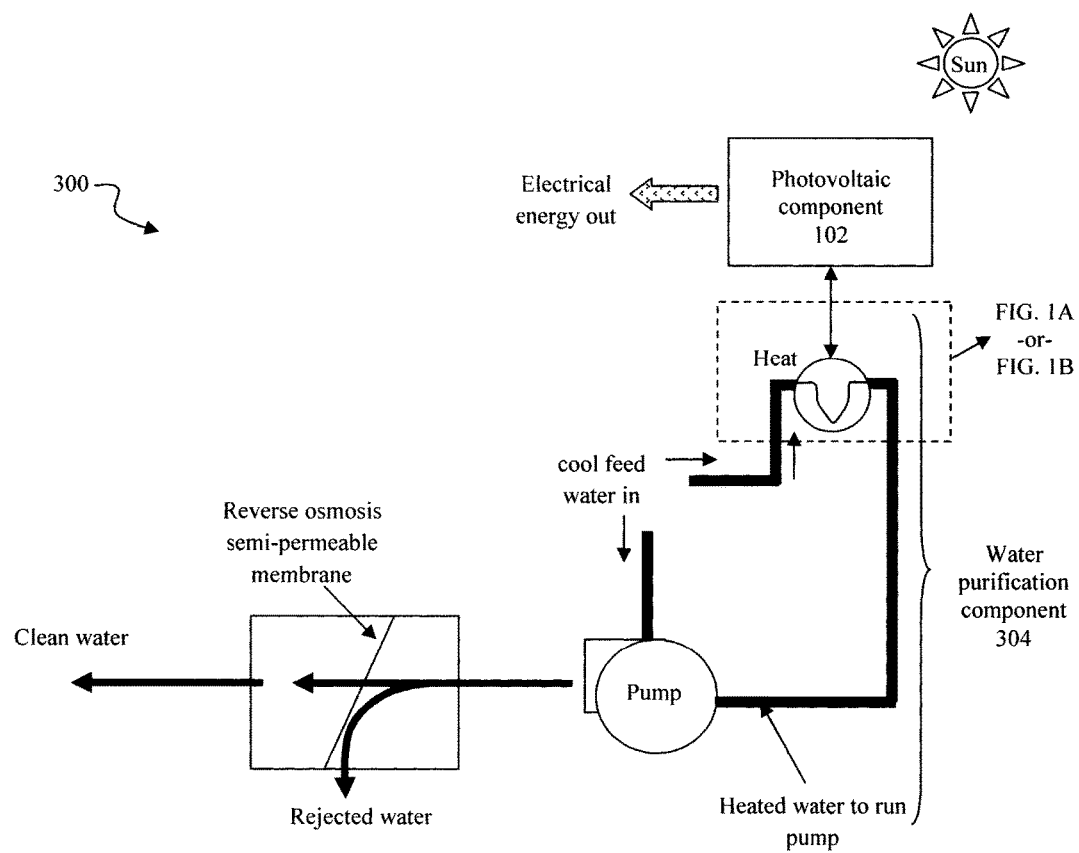
FIG. 3 is a diagram illustrating an exemplary solar thermal water purification system having a photovoltaic component and a (reverse osmosis-based) water purification component according to an embodiment of the present invention.

The photovoltaic component 102 of solar thermal water purification system 300 functions in the same manner as described above except that here, instead of driving an MSF desalinator, the heated input water drives a water pump of the water purification component 304. As shown in FIG. 3, cool (salt/dirty) water input to the system 300 is heated by the photovoltaic component 102. The heated water is used to drive a water pump of the water purification component 304. Suitable heat-driven water pumps are described, for example, in U.S. Pat. No. 4,212,593 issued to Chadwick, entitled "Heat-Powered Water Pump" (hereinafter "U.S. Pat. No. 4,212,593"), the contents of which are incorporated by reference as if fully set forth herein. The water pumps described in U.S. Pat. No. 4,212,593 can be run on steam.

Cool input water is also fed to the pump, and by action of the pump (see above) is pushed through a reverse osmosis semi-permeable membrane. Clean water can be collected on the other side of the membrane. Since only a certain amount of water can flow through the membrane, some of the input water stream is rejected.

Figure 4:
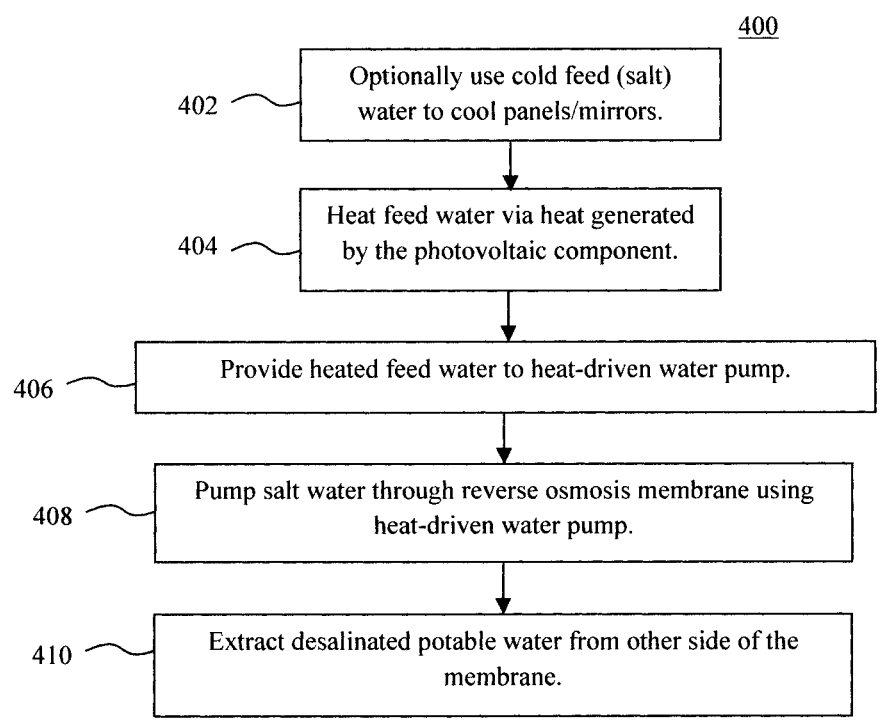
FIG. 4 is a diagram illustrating an exemplary methodology for water purification using, e.g., the system of FIG. 3, according to an embodiment of the present invention.

An exemplary methodology 400 for operating system 300 is now described by way of reference to FIG. 4. It is notable that, while described as a series of discrete steps performed in series, the various steps of methodology 400 may be performed simultaneously and/or in a different order than described. For instance, heat generation from the photovoltaic component 102 and desalination via the water purification component 304 will generally occur simultaneously throughout the process.

Optionally, in step 402 the feed water is used to cool the photovoltaic panels of the photovoltaic component while at the same time absorbing waste heat from the panels. Any suitable means for introducing the salt water into the system can be employed, such as pumping, passive flowing from a salt water source, etc.

Specifically, as described above, the conduit 106 that carries the salt water through the system can run behind the photovoltaic panels (and be in physical/thermal contact with the photovoltaic panels) such that the cool feed water that flows through the conduit 106 cools the photovoltaic panels and as such picks up waste heat from the photovoltaic panels. Preferably, this occurs prior to the feed water being heated at the front of the panels (see step 404 described below) which significantly raises the temperature of the feed water thus making it likely unsuitable for cooling purposes.

In step 404, the feed water is heated using heat generated by the photovoltaic component 102, and in step 406 the heated feed water is provided to the heat-driven water pump. In step 408, the heat-driven water pump pumps salt water through the reverse osmosis membrane. In step 410, desalinated water is collected on the other side of the reverse osmosis membrane (from the side of the membrane opposite the pump.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A solar thermal water purification system, comprising:
   a water purification component for desalinating salt water, the water purification component having multiple stages through which the salt water passes, and condensers in each of the stages;
   a conduit, connected to the water purification component, through which the salt water can be introduced to a first stage of the water purification component; and
   a photovoltaic component configured to heat the salt water prior to the salt water entering the first stage of the water purification component, wherein the photovoltaic component comprises at least one photovoltaic panel which is curved to reflect solar radiation incident on the photovoltaic panel to a radial focal point that extends perpendicular to a direction of curvature of the photovoltaic panel, wherein the conduit passes first behind the photovoltaic panel and is in physical and thermal contact with the photovoltaic panel and second in front of the photovoltaic panel so that the conduit is present at the radial focal point, whereby the salt water when traveling through the conduit passes sequentially behind and then in front of the photovoltaic panel, and wherein desalinated water evaporates and condenses in each of the stages to be collected as pure water.

2. The solar thermal water purification system of claim 1, wherein the photovoltaic component comprises at least one mirror which is curved to reflect solar radiation incident on the mirror to the radial focal point.

3. The solar thermal water purification system of claim 1, wherein the conduit passes through each of the stages adjacent to the condensers.

4. The solar thermal water purification system of claim 3, wherein the conduit passes through each of the stages in succession in a first direction, beginning with a last stage and ending with the first stage, and wherein the salt water passes through the stages in a second direction, beginning with the first stage and ending with the last stage.

5. The solar thermal water purification system of claim 1, wherein the stages are separated from one another by valves.

6. The solar thermal water purification system of claim 1, further comprising a condensate conduit for removing the desalinated water from the condensers in each of the stages.

7. The solar thermal water purification system of claim 1, wherein the condensers comprise metal plates.

8. A method for water purification, the method comprising the steps of:
   providing a thermal water purification system comprising: i) a water purification component having multiple stages, and condensers in each of the stages, ii) a conduit, connected to the water purification component and iii) a photovoltaic component wherein the photovoltaic component comprises at least one photovoltaic panel which is curved to reflect solar radiation incident on the photovoltaic panel to a radial focal point that extends perpendicular to a direction of curvature of the photovoltaic panel, wherein the conduit passes first behind the photovoltaic panel and is in physical and thermal contact with the photovoltaic panel and second in front of the photovoltaic panel so that the conduit is present at the radial focal point;
   heating salt water using the photovoltaic component prior to the salt water entering a first stage of the water purification component, wherein the heating comprises passing the salt water, via the conduit, sequentially behind and then in front of the photovoltaic panel;
   passing the salt water through the water purification component, wherein the salt water which has been heated creates steam in each of the stages, and wherein desalinated water from the steam condenses on the condensers; and
   removing the desalinated water from the condensers in each of the stages.

9. The method of claim 8, further comprising the step of:
   introducing the salt water to the first stage of the water purification component through the conduit.

10. The method of claim 9, further comprising the step of:
    heating the salt water in the conduit using the solar radiation reflected off of the photovoltaic panel.

11. The method of claim 10, wherein the photovoltaic component comprises at least one mirror which is curved to reflect solar radiation incident on the mirror to the radial focal point, the method further comprising the step of:
    heating the salt water in the conduit using the solar radiation reflected off of the mirror.

12. The method of claim 10, further comprising the step of:
    cooling the photovoltaic panel using the salt water in the conduit before introducing the salt water to the first stage of the water purification component.

13. The method of claim 9, wherein the conduit passes through each of the stages adjacent to the condensers, the method further comprising the step of:
    cooling the condensers using the salt water passing through the conduit.

14. The method of claim 13, wherein the conduit passes through each of the stages in succession in a first direction, beginning with a last stage and ending with the first stage, and wherein the salt water passes through the stages in a second direction, beginning with the first stage and ending with the last stage, the method further comprising the step of:
    cooling the condensers in each of the stages to a different temperature using the salt water passing through the conduit.

15. The method of claim 8, wherein the stages are separated from one another by valves, the method further comprising the step of:
    passing the salt water through the stages of the water purification component in succession via the valves.

16. The method of claim 8, further comprising the step of:
    removing the desalinated water from the condensers in each of the stages via a condensate conduit.

17. The method of claim 8, wherein the salt water is heated to a temperature of from about 70° C. to about 120° C. and ranges therebetween.

18. The method of claim 9, further comprising the step of: feeding cold salt water into the conduit.

19. The method of claim 18, wherein a temperature of the cold salt water is—from about 10° C. to about 35° C. and ranges therebetween.

\* \* \* \* \*